United States Patent
Harrington

(10) Patent No.: US 8,458,187 B2
(45) Date of Patent: *Jun. 4, 2013

(54) METHODS AND SYSTEMS FOR VISUALIZING TOPIC LOCATION IN A DOCUMENT REDUNDANCY GRAPH

(75) Inventor: Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 498 days.

This patent is subject to a terminal disclaimer.

(21) Appl. No.: 12/627,334

(22) Filed: Nov. 30, 2009

(65) Prior Publication Data

US 2011/0131211 A1   Jun. 2, 2011

(51) Int. Cl.
*G06F 7/00* (2006.01)
*G06F 17/30* (2006.01)

(52) U.S. Cl.
USPC .......................................................... 707/741

(58) Field of Classification Search
None
See application file for complete search history.

(56) References Cited

U.S. PATENT DOCUMENTS

| | | | |
|---|---|---|---|
| 5,706,503 A | 1/1998 | Poppen et al. | |
| 6,052,693 A * | 4/2000 | Smith et al. | 1/1 |
| 6,301,579 B1 | 10/2001 | Becker | |
| 6,369,819 B1 | 4/2002 | Pitkow et al. | |
| 6,515,666 B1 | 2/2003 | Cohen | |
| 7,096,420 B1 | 8/2006 | Peikes | |
| 7,549,309 B2 | 6/2009 | Beringer et al. | |
| 2009/0024962 A1 * | 1/2009 | Gotz | 715/838 |
| 2009/0265330 A1 * | 10/2009 | Cheng et al. | 707/5 |
| 2011/0161174 A1 * | 6/2011 | Simms et al. | 705/14.58 |

OTHER PUBLICATIONS

Duda et al, Pattern Classification 2001, Wiley and Sons, $2^{nd}$ ed, 550-555.*
Bernstein et al., Redundant Documents and Search Effectiveness Nov. 5, 2005, CIKM'05, pp. 736-743.*
Maron et al., On Relevance, Probabilistic Index and Information Retrieval Oct. 1959, [journal unknown: retrieved from http://ctp.di.fct.unl.pt/~jmag/wamse/papers/1960.On%20Relevance,%20Probabilistic%20Indexing%20and%20Information%20Retrieval.pdf on Jul. 2, 2012], pp. 216-244 (first paragraph classifies redundancy and relevance as different subjects used in.*
Xin et al., Extracting Redundancy-Aware Top-K Patterns Aug. 20-23, 2006, Conf. on Knowledge Discovery in Databases, pp. 444-453.*
Marszalek, M. et al., "Semantic Hierarchies for Visual Object Recognition," *IEEE Conference on Computer Vision and Pattern Recognition* Jun. 17-22, 2007.

(Continued)

*Primary Examiner* — Jason Liao
(74) *Attorney, Agent, or Firm* — Luis M. Ortiz; Kermit D. Lopez; Tuesday A. Kaasch

(57) ABSTRACT

Methods, systems, and computer program products can visualize topic location in a document redundancy graph. Document subcomponents such as, for example, document paragraphs of a document or document set can be searched for user interface specified search data and a determination can be made as to which document subcomponents contain information relating to the search data. Based on the redundancy graph data, a determination can then be made as to which particular user selectable node(s) of the graph contain the particular document subcomponent(s). Data for identifying the determined particular user selectable node(s) on a user interface can be generated and rendered to allow a user to quickly locate the particular user selectable node(s) on the redundancy graph. The particular user selectable nodes themselves can for example be visually highlighted on the graph. Keyword indexing can be used to assure chosen keywords are keywords relating to particular topics contained in the document set.

20 Claims, 10 Drawing Sheets

OTHER PUBLICATIONS

Roddick, J.F. et al., "SemGrAM—Integrating Semantic Graphs into Association Rule Mining," *ACM International Conference Proceeding Series* (2007) 311:129-137.

Mayberry, III, M.R. et al., "Generating Semantic Graphs Through Self-Organization," *Proceedings of the AAAI Symposium on Compositional Connectionism in Cognitive Science* (2004) Washington, DC.

Harley, T.D.R. et al., "MSSG: A Framework for Massive-Scale Semantic Graphs," *Proceedings of 2006 IEEE International Conference on Cluster Computing* Sep. 2006, pp. 1-10.

Leskovee, J. et al., "Impact of Linguistic Analysis on the Semantic Graph Coverage and Learning of Document Extracts," *Aaai Conference on Artificial Intelligence* (2005) pp. 1069-1074.

De Marneffe, M.C. et al., "Aligning Semantic Graphs for Textural Inference arid Machine Reading," *AAAI Spring Symposium at Stanford* (2007).

Hirsch, C. et al., "Interactive Visualization Tools for Exploring the Semantic Graph of Large Knowledge Spaces," *Workshop on Visual Interfaces to the Social and the Semantic Web*, Feb. 8, 2009, Sanibel Island, Florida.

* cited by examiner

METHODS AND SYSTEMS FOR VISUALIZING TOPIC LOCATION IN A DOCUMENT REDUNDANCY GRAPH

TECHNICAL FIELD

Embodiments are generally related to data-processing systems and methods. Embodiments also relate in general to the field of computers and similar technologies and, in particular, to software utilized in this field. In addition, embodiments relate to document redundancy graphs.

BACKGROUND OF THE INVENTION

With the advent of the Internet and the World Wide Web, a vast amount of digital information is available over such networks. Information search and retrieval systems are utilized with respect to such networks to locate documents with largely redundant information in response to queries entered by a user. If the retrieved information is not a part of the data that is commonly shared, the user may be forced to examine a multitude of documents and wade through common material in a search of an uncommon fact. Further, if the information sought is available in multiple documents, then the user may not be able to select the optimal suite for presenting the material.

In an effort to address such problems, portions of the information that is shared by various members of the document set can be first determined. Such information can be utilized to present a document navigation aid that removes the redundant information so that the user may visit a topic once and then select the presentation of a topic based on document properties. Typical information redundancy systems can eliminate such redundant information from the document(s). Information redundancy systems can objectively measure duplication, locate duplicate content, eliminate extraneous content, and harmonize text variations within the document sets. Such information redundancy approaches can generally locate documents stored in an electronic media in response to the query entered by the user and provide multiple entry paths.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved method and system for visualizing topic location in a document redundancy graph.

According to one aspect, a method for visualizing topic location in a document redundancy graph is provided. Data representing a document redundancy graph for a document or document set can be provided. User interface specified search data can be determined. Document subcomponents such as, for example, document paragraphs of the document or document set can be searched for the search data. One or more document subcomponents containing data related to search data can be determined. A determination can be made from the redundancy graph data as to which user selectable node(s) contain the determined document subcomponent(s). Data for identifying the determined user selectable node(s) on a user interface can be generated.

The generated data can be rendered on a user interface such that the determined user selectable node(s) are identified.

By determining particular user selectable nodes containing one or more document subcomponents containing information relating to search data and generating and rendering data identifying those particular user selectable nodes on the redundancy graph, a user can quickly and easily locate which user selectable nodes of a rendered redundancy graph contain information relating to the search data.

In one embodiment, data can be generated for visually highlighting the determined user selectable nodes on the user interface. The generated data can be rendered on the user interface such that the user selectable nodes of a rendered redundancy graph are visually highlighted.

In order to aid keyword selection, index of keywords present in the document set can be generated. A keyword index can assure that the chosen word is present in the document set. The generated keyword index can be rendered on the user interface. User interface specified search data can be a user interface entered selection of one or more keywords.

One or more navigation document subcomponent references to information relating to selected keyword(s) can be generated based on one or more determined document subcomponents. The generated one or more navigation document subcomponent references can be rendered on the user interface. These rendered navigation document subcomponent references quickly provide the user with subcomponent information relating to the selected keywords and can also provide a means to navigate to the particular information contained in those subcomponent references.

Receiving a user interface entered selection of a particular visually highlighted user selectable node can cause navigation or linking to information contained in the selected visually highlighted node.

According to another aspect, a system for visualizing a topic location in a document redundancy graph is provided. The system comprises a processor, a data bus coupled to the processor, and a computer-usable medium embodying computer code, the computer-usable medium being coupled to the data bus. The computer program code can comprise instructions executable by the processor and configured to perform one or more of the aforementioned methods for visualizing topic location on a redundancy graph. For example, data representing a document redundancy graph for a document or document set can be provided. User interface specified search data can be determined. A search can be made for search data in document subcomponents of the document or document set. One or more of the document subcomponents containing data related to search data can be determined. A determination from the redundancy graph data can be made as to which user selectable node(s) contain the determined document subcomponent(s). Data can be generated for identifying the determined user selectable node(s) on a user interface. In one embodiment, data can be generated for visually highlighting the determined user selectable nodes on the user interface and rendered on the user interface such that the user selectable nodes of a rendered redundancy graph are visually highlighted.

According to yet another aspect, a computer program product is provided comprising a computer-usable data carrier storing instructions that, when executed by a computer, cause the computer to perform one or more of the aforementioned methods for visualizing topic location on a redundancy graph.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
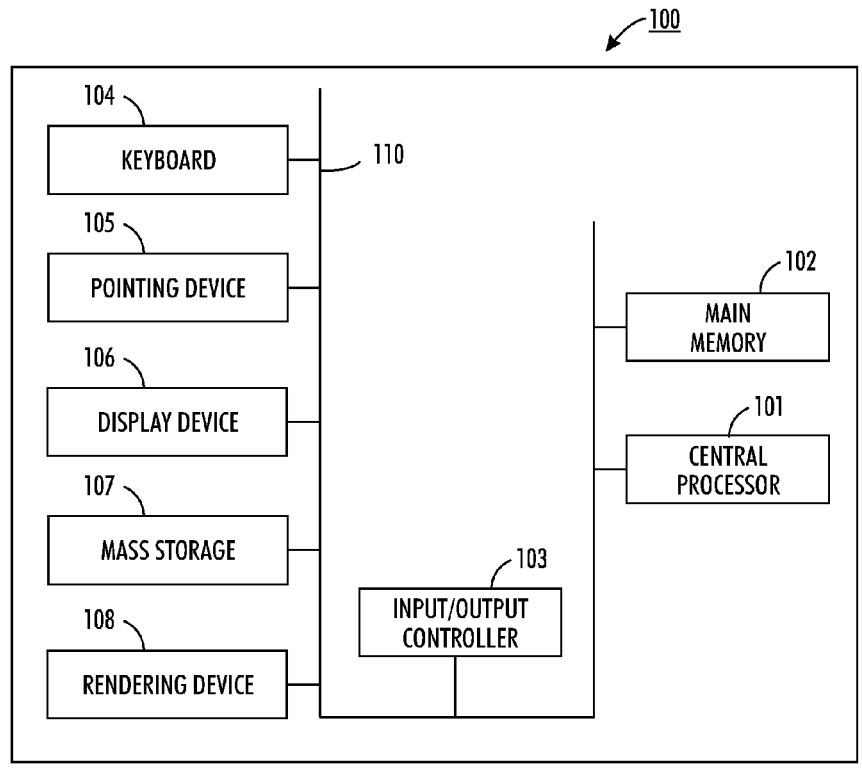
FIG. 1 illustrates a schematic view of a computer system in which the present invention may be embodied.

The particular values and configurations discussed in these non-limiting examples can be varied and are cited merely to illustrate at least one embodiment and are not intended to limit the scope thereof.

It has been determined that in today's world of vast amounts of digital information connected through networks like the World Wide Web, it is typical for a user to search for a topic and receive links to thousands of document in response. If the topic is sufficiently specific, then the response document may have a lot of information in common. If the user is looking for a particular bit of information, there are a couple of problems that may be faced. If the information is not part of the data that is commonly shared, then the user may be forced to examine document after document, wading through the common material in search for the uncommon fact. On the other hand, if the information sought is available in multiple documents, the user may not know which document is the best one for presenting the material.

It has been determined that when faced with many documents with largely redundant information (such as results from a web search) it can be useful to visualize the information contained by the entire set. But beyond that, it can be helpful to determine the documents and the locations within those documents where a particular topic is discussed.

The aforementioned determined problems can be addressed by first determining what portion of the information is shared across the various members of the document set. If this is known, then the user can be presented with document navigation aids that remove the redundancy so that the user need only visit a topic once and may select the presentation of a topic based on some document properties (such as readability).

Methods and systems for constructing a document redundancy graph can aid the user in navigating the set of documents. Constructing such a graph from document structure and paragraph paring data allow the user to visualize the entire document set. The constructed document redundancy graph can provide an overview of the total information, show the core information areas that are often repeated, and areas of specialized information that are unique to a document.

Technical features described in this application can be used to construct various embodiments of methods and systems for visualizing topic location in a document redundancy graph. These methods and systems address the aforementioned problem of visualizing topic location enabling a user to visualize within a document or document set a desired topic is discussed, and to navigate to that topic.

Note that redundancy can be determined at a paragraph level or some other document subcomponent level depending on the desired granularity of the documents. For example, the methods and/or systems for visualizing topic location of the embodiments disclosed herein can be utilized to visualize topic location in a redundancy graph in which redundancy has been determined at a finer level than the paragraph level, such as sentences or phrases, or alternatively at coarser level such as sections or documents.

The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method may be practiced with other computer system configurations, including hand-held devices, multi-processor systems, microprocessor-based or programmable consumer electronics, networked PCs, minicomputers, mainframe computers, and the like.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing apparatus 100 as desired. As illustrated, the various components of the data-processing apparatus 100 communicate through a system bus 110 or similar architecture. It can be appreciated that the data-processing apparatus 100 may be in some embodiments a mobile computing device such as a Smartphone, a laptop computer, iPhone, etc. In other embodiments, data-processing apparatus 100 may function as a desktop computer, server, and the like, depending upon design considerations.

Figure 2:
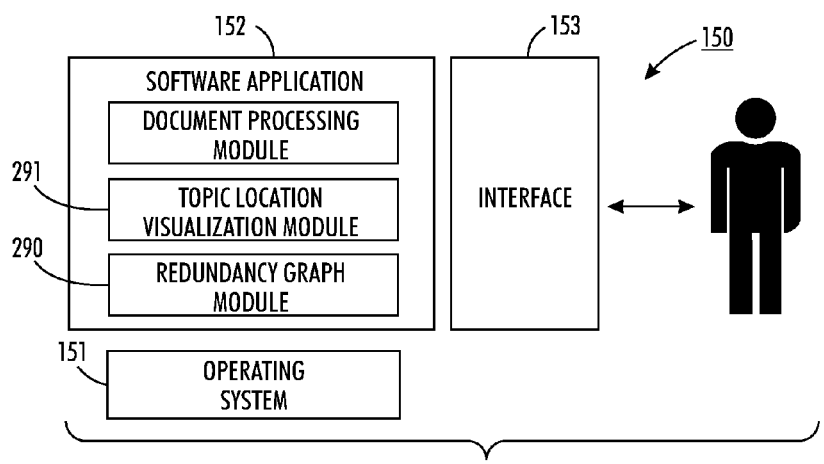
FIG. 2 illustrates a schematic view of a software system including an operating system, application software, and a user interface for carrying out the present invention.

FIG. 2 illustrates a computer software system 150 for directing the operation of the data-processing apparatus 100 depicted in FIG. 1. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

Note that the term "module" as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term "module" may also simply refer to an application such as a computer program design to assist in the performance of a specific task such as word processing, accounting, inventory management, etc.

The interface 153, which is preferably a graphical user interface (GUI), also serves to display results, whereupon the user may supply additional inputs or, for example, terminate a given session. In one embodiment, operating system 151 and interface 153 can be implemented in the context of a "Windows" system. It can be appreciated, of course, that other types of systems are possible. For example, rather than a traditional "Windows" system, other operating systems such as, for example, Linux may be employed with respect to operating system 151 and interface 153 in another embodiment. The document processing module 152 can include a module 290 for constructing a document redundancy graph. Module 152 can be adapted for collapsing redundant nodes and unique node sequence with respect to the document set. Application module 152, on the other hand, can include instructions such as the various operations described herein with respect to the various components and modules described herein such as, for example, the methods depicted in FIG. 5 and FIG. 6.

Figure 3:
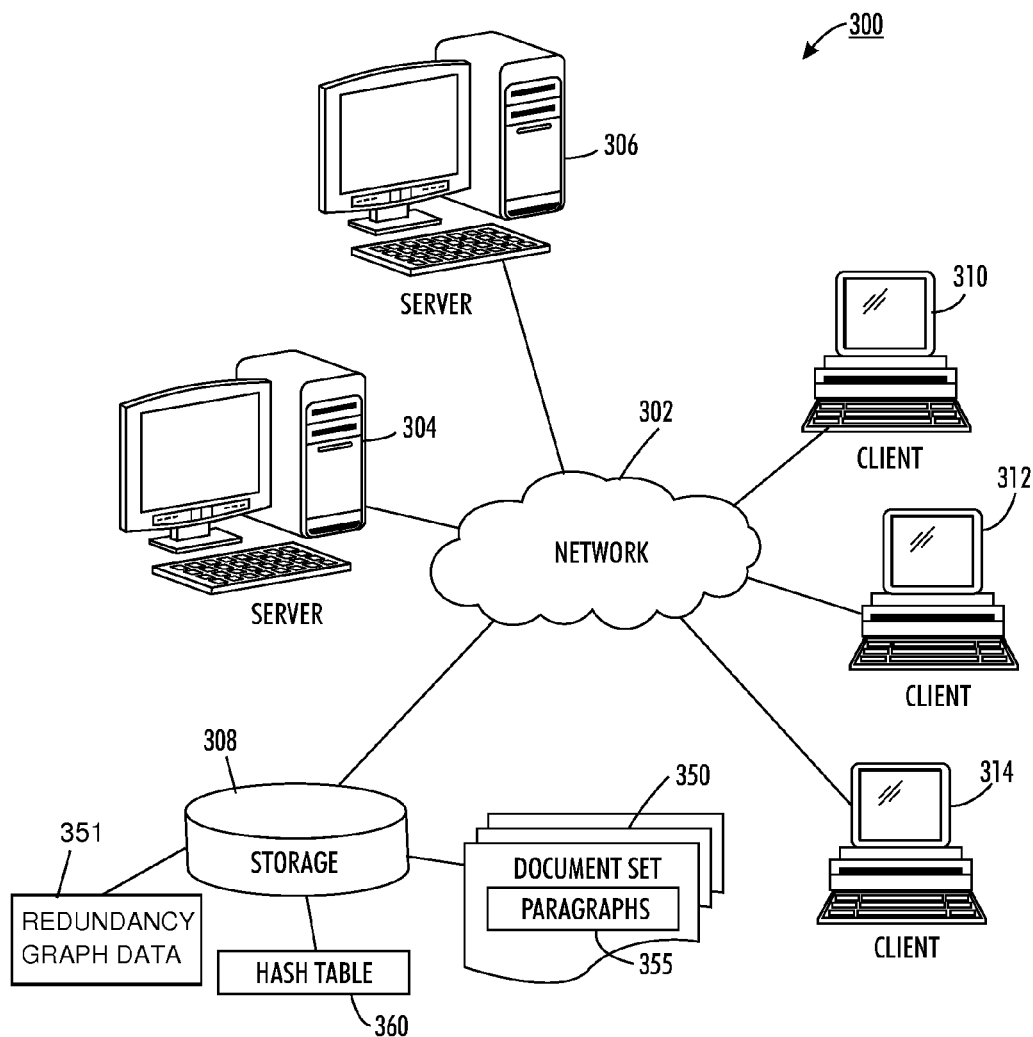
FIG. 3 illustrates a graphical representation of a network of data processing systems in which aspects of the present invention may be implemented.

FIG. 3 illustrates a graphical representation of a network of data processing systems in which aspects of the present invention may be implemented. Network data processing system 300 is a network of computers in which embodiments of the present invention may be implemented. Network data processing system 300 contains network 302, which is the medium used to provide communication links between various devices and computers connected together within network data processing system 100. Network 302 may include connections such as wire, wireless communication links, or fiber optic cables.

In the depicted example, servers 304 and 306 connect to network 302 along with storage unit 308. In addition, clients 310, 312, and 314 connect to network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations. In the depicted example, server 304 provides data such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content. It should be appreciated that the computational tasks described herein may be carried out on multiple servers that communicate their data and results over a network 302. It should also be appreciated that the clients 310, 312 and/or 314 may provide an interface to the user for collecting input and presenting results and can additionally communicate tasks to the servers 304 and/or 306 over the network 302.

A document set 350 stored in the database 308 can be accessed by the end-user work stations 310, 312 and 314 in order to retrieve information related to a topic of interest. The document set 350 can be stored in an electronic form in the database 308, can include graphic or other information displays derived from separate computer programs and exported into a computer word processor program, and stored as a single computer file in word processor format. The document set 350 may also be distributed over multiple storage locations and is accessible via a network (e.g., web pages accessible via the Internet and World Wide Web). The database 308 may store information regarding the documents of the document set in addition to, or instead of, storing the documents themselves. Many documents are functionally linked to other documents that deal with a particular business or academic function and can be referred to as document sets. The document set 350 can include a number of paragraphs 355 associated with redundancy information. Redundancy graph data 351 representing a redundancy graph constructed from the document set 350 can also be stored in database 308.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes, or host computers, consisting of thousands of commercial, government, educational, and other computer systems that route data and messages. Of course, network data processing system 300 also may be implemented as a number of different types of networks such as, for example, an intranet, a local area network (LAN), or a wide area network (WAN). FIG. 1 is intended as an example and not as an architectural limitation for different embodiments of the present invention.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention. Note that in FIGS. 1-10, identical or similar parts are generally indicated by identical reference numerals.

The following description is presented with respect to embodiments of the present invention, which can be embodied in the context of a data-processing system such as data-processing system 100 and computer software system 150 depicted respectively in FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

By way of example, U.S. patent application Ser. No. 12/533,901, entitled "Methods for Construction of a Document Redundancy Graph", to Steven Harrington, filed on Jul. 31, 2009, the disclosure of which is incorporated herein by reference in its entirety, disclose methods and systems for a constructing document redundancy graph. As will be explained more fully below, U.S. patent application Ser. No. 12/533,901 discloses systems and methods which can be utilized for constructing a document redundancy graph with respect to a document set such that each node in the graph represents a unique cluster of information. The methodology consists of techniques for analyzing the document paragraphs as well as a set of similarity criteria utilized to detect redundant paragraphs.

In particular, the method of constructing a document redundancy graph comprises: representing at least one paragraph associated with a document set as a node among a plurality of nodes, wherein each node among the plurality of nodes with respect to the redundancy graph represents a unique cluster of information; merging the plurality of nodes associated with redundant information by configuring a data structure with respect to a pair of information identifiers in association with a probability value, wherein the probability value sorts a plurality of information matches in an order of decreasing certainty; and combining the plurality of nodes unique to a single document by comparing each information identifier among the pair of information identifiers to an entry in the data structure in an order wherein the data structure eliminates inconsistency associated with the plurality of information matches.

Figure 4:
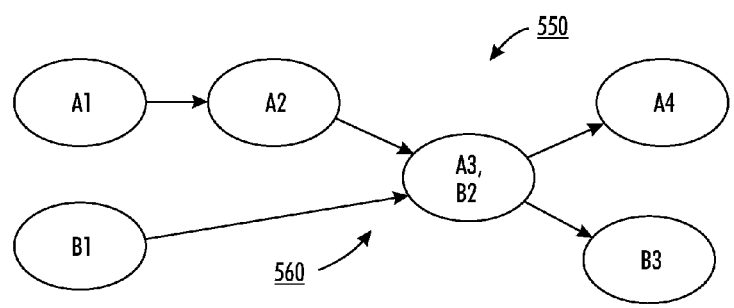
FIG. 4 illustrates a graphical representation illustrating an example of merged nodes with redundant information.

The document redundancy graph can be constructed by collecting paragraphs in the document set that provide similar information into nodes, thereby identifying and removing the redundancy. Also, sequences of paragraph of information unique to a document can be grouped into nodes for a more compact representation. By way of example, FIG. 4 illustrates a graphical representation illustrating a document 550 as a series of paragraph nodes. The paragraph associated with the document 550 can be represented as a series of paragraph nodes such as paragraph nodes A1, A2, A3, and A4. Each node can include a unique cluster of information related to the paragraph associated with the document 550. The nodes A1, A2, A3, and A4 can be linked to each other based on sequence of paragraph list in the document 550.

Paragraphs of multiple documents can be analyzed and nodes with redundant information can be combined into a single node. Sequences of unique paragraphs can be collected to form chain nodes. More detailed methods and systems for forming combined nodes and chain nodes are disclosed in U.S. patent application Ser. No. 12/533,901.

Figure 8:
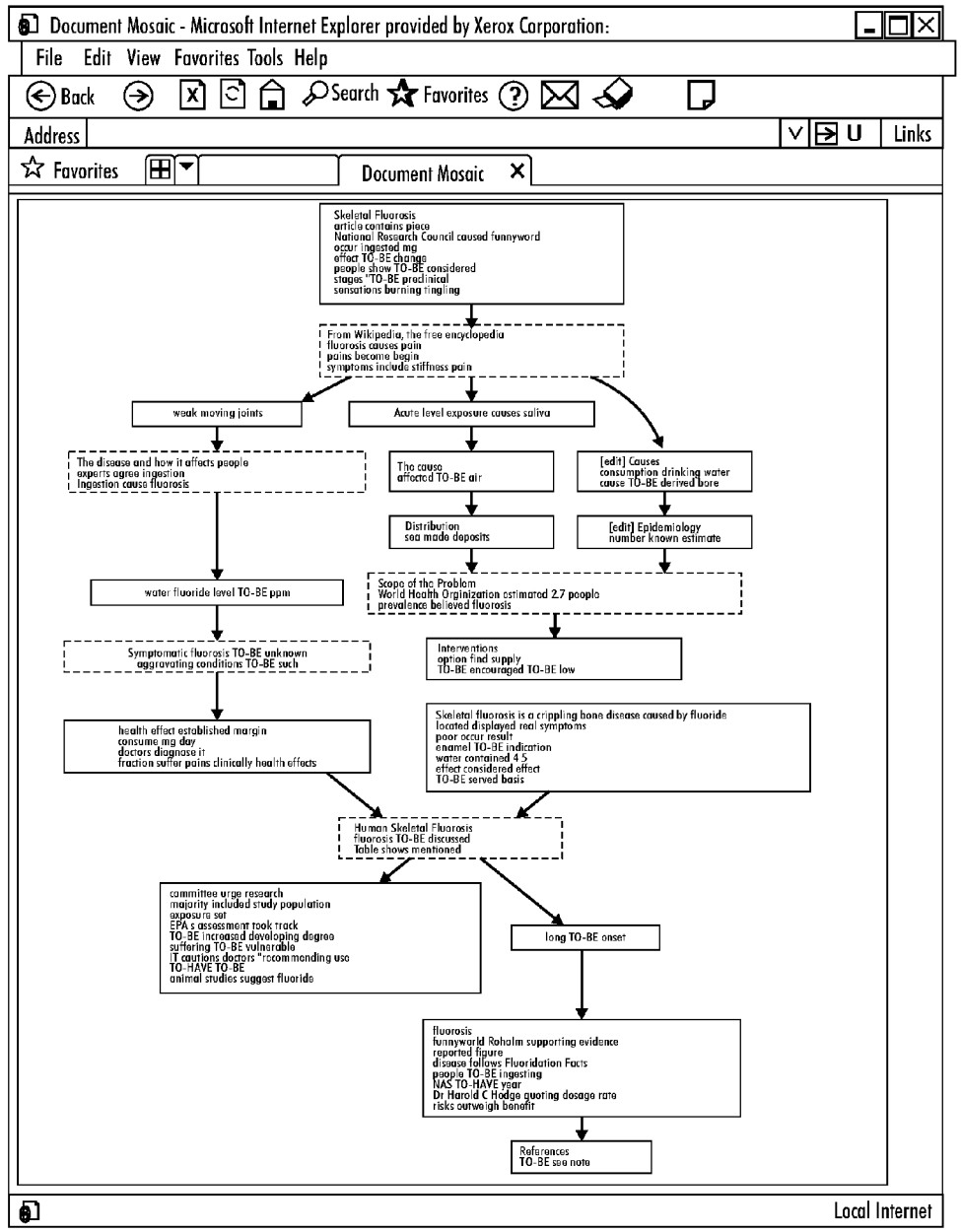
FIG. 8 illustrates a display image of an exemplary redundancy graph for four documents.
Figure 9:
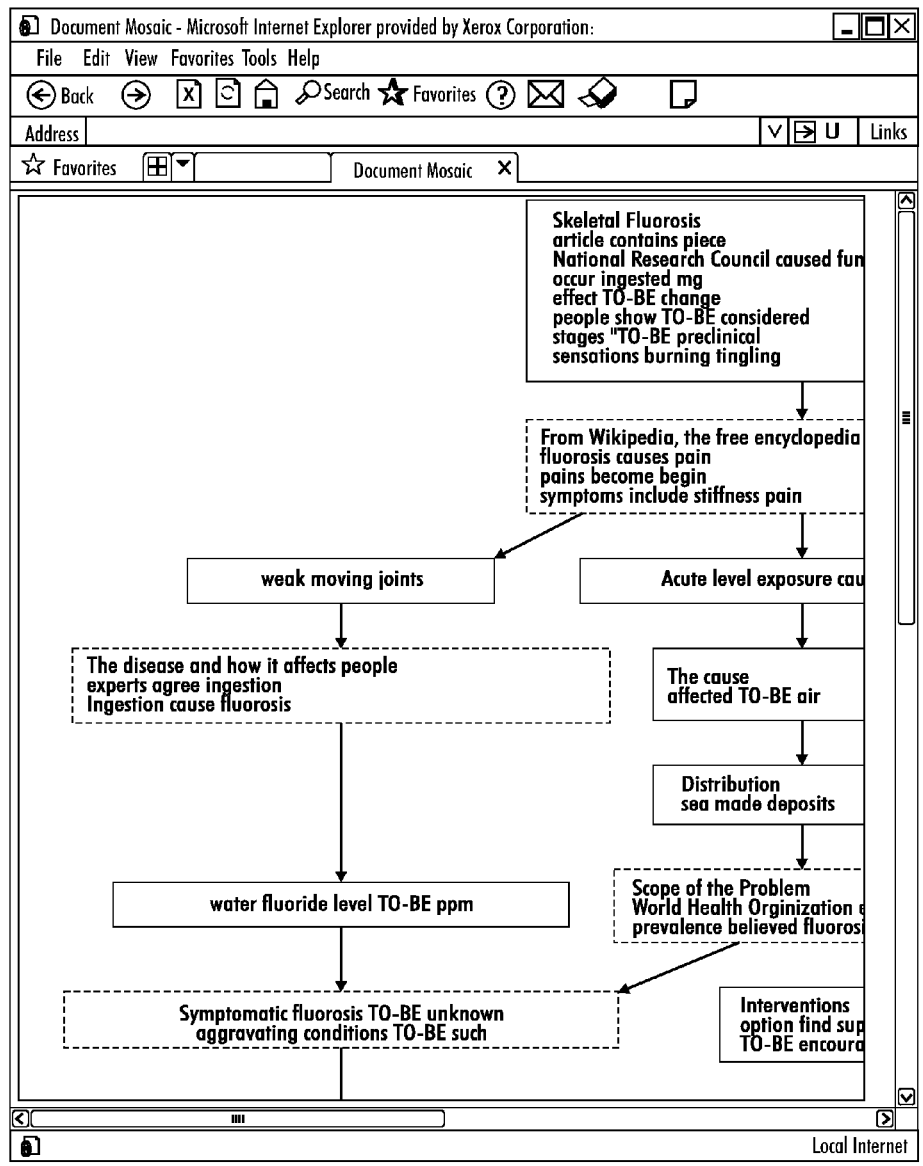
FIG. 9 illustrates an enlarged portion of the display image of the exemplary redundancy graph shown in FIG. 8.

Reference will now be made to FIGS. 8 & 9 of the accompany drawings which respectively illustrate an image of an exemplary constructed redundancy graph of the information in four documents and an image of an enlarged portion of the redundancy graph. Style attributes can be used in order to convey information about the elements to the user. For example, in FIG. 8 the nodes of the graph that correspond to paragraphs that have redundant information found in multiple documents are rendered with dashed borders, while the nodes that correspond to paragraphs with unique information have solid borders. Other style attributes such as color can also be used to convey information. For example, a unique color can be assigned to each document and the borders or nodes with novel information can be rendered in their document color.

Figure 10:
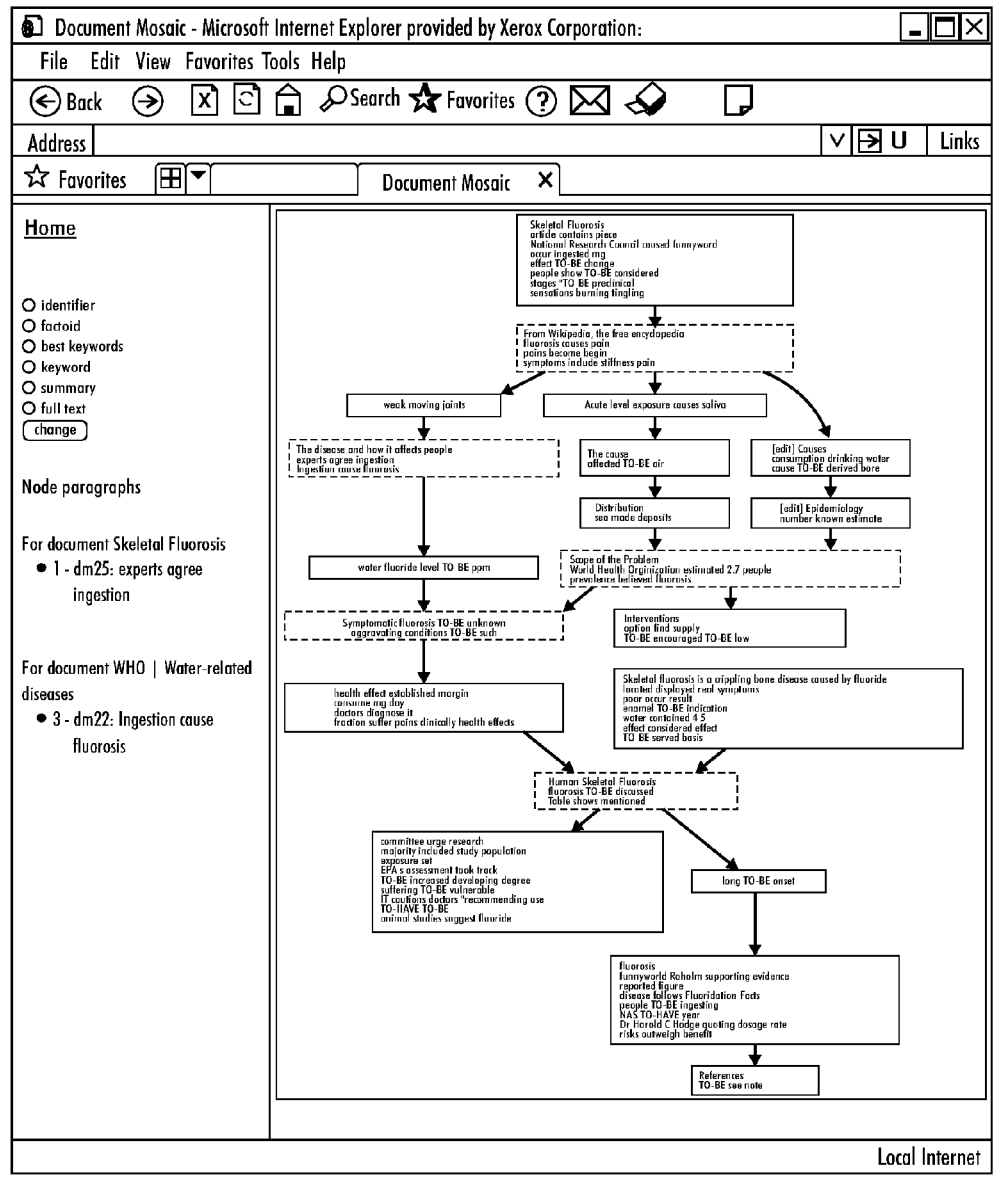
FIG. 10 illustrates a display image of the redundancy graph shown in FIG. 8 in conjunction with selected node paragraph information rendered in response to selection of a particular node.

The nodes of the graph and the paragraphs can be connected utilizing a set of hyperlinks such that when a node of a graph is clicked, the list of paragraphs is presented leading to access to the paragraphs themselves. The nodes to the paragraphs can also be connected via labels in the nodes. The labels may comprise cryptic paragraph identifiers to summaries or to full paragraph content, depending upon the space required to allocate to the graph and the nodes. By way of example, FIG. 10 illustrates a display image showing how clicking on a graph node brings up information on the paragraphs corresponding to the node. A user clicking on respective paragraphs causes the system in turn to load and display the actual content of the respective paragraphs. Thus, clicking on a node of the graph leads the user to the information that node represents. In this way the graph can be used to navigate the document set; however, it may not be clear to the user just which node of the graph contains the topic of interest.

Figure 5:
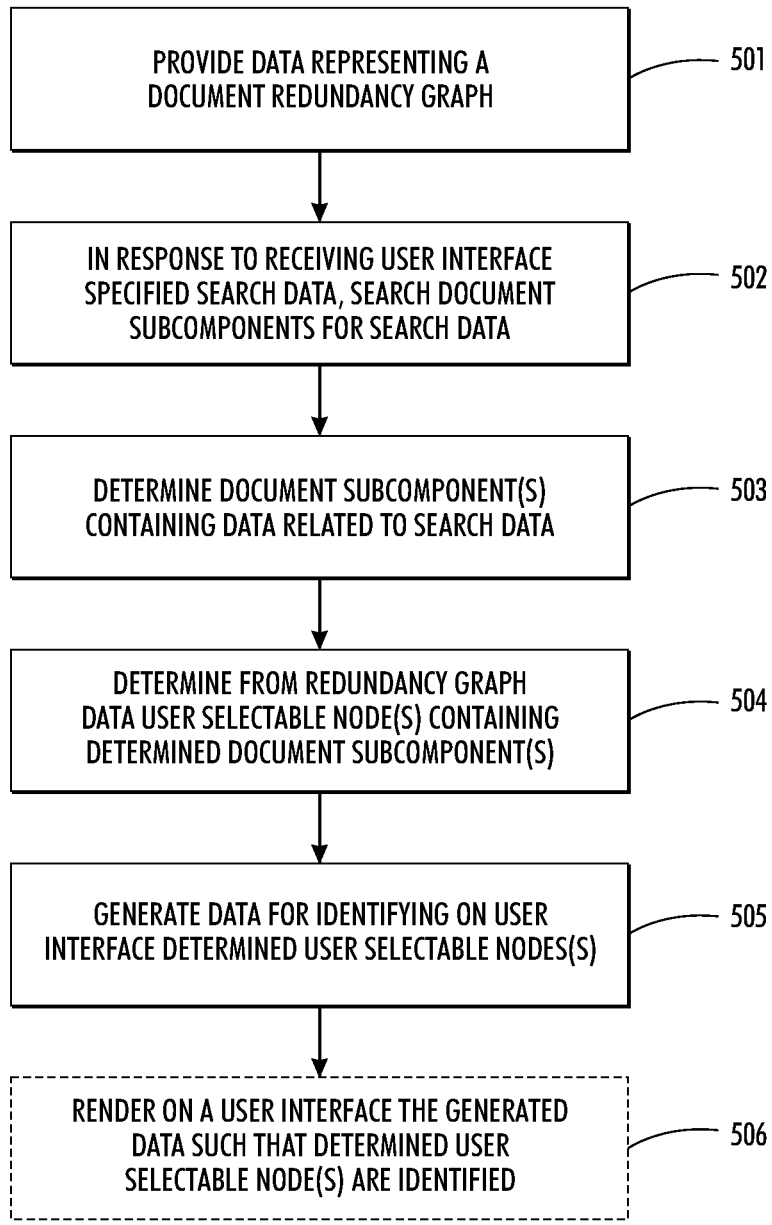
FIG. 5 illustrates a flow chart outlining a process for visualizing topic location on a redundancy graph according to an embodiment.

FIG. 5 generally illustrates a method for visualizing topic location in a redundancy graph according to one embodiment. Method of FIG. 5 can be, for example, implemented in the system of FIG. 1. Method of FIG. 5 can be implemented for visualizing topic location in any redundancy graph that includes user selectable nodes containing collected subcomponent document data that contain at least some common content.

Initially, data representing a document redundancy graph is provided (S501). User interface specified search data is received and, in response, document subcomponent(s) contained in the document set can be searched to find the search data (S502). The document subcomponent(s) containing data related to search data can then be determined (S503). User selectable node(s) containing the determined document subcomponent(s) can be determined from the redundancy graph data (S504). Data identifying the determined user selectable node(s) can be generated (S505). The generated data identifying the determined user selectable node(s) can be rendered on the user interface on which the redundancy graph is being rendered (S506). Method of FIG. 5 enables a user to learn which nodes of the graph may contain information about a particular topic. Note that processes S501 to S506 can be implemented in the same computer processor or may be implemented using a plurality of different processors. By way of example, in the system of FIG. 3, processes S501 to S505 can be, for example, implemented by a server 306 and S506 an be implemented by client 312.

Figure 6:
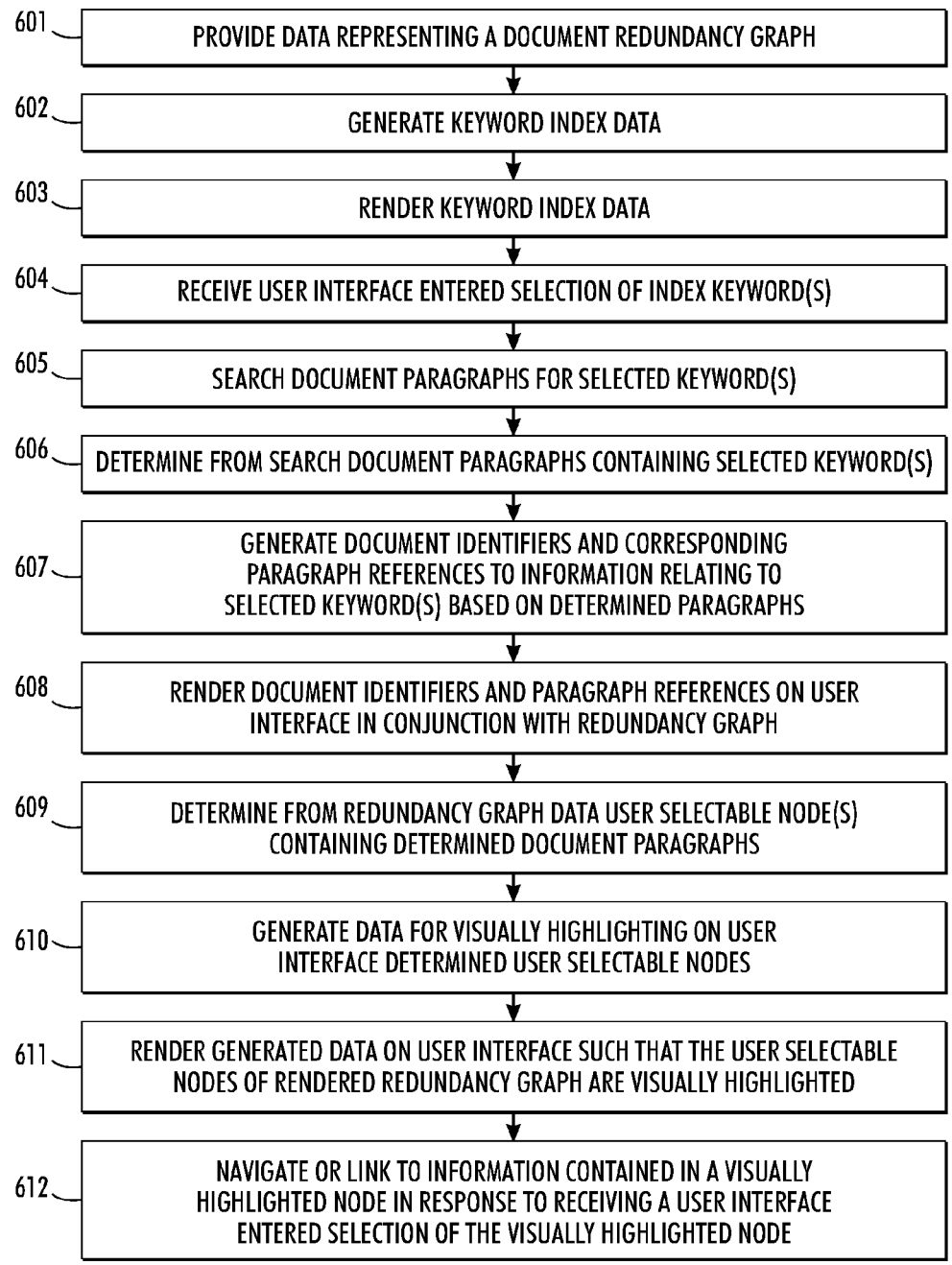
FIG. 6 illustrate a flow chart of a process for visualizing topic location on redundancy graph according to an embodiment.

A more detailed example of a method for visualizing topic location in a redundancy graph according to an embodiment will now be described with reference to the accompanying figures, and in particular, FIG. 6. In the method of FIG. 6, the document redundancy graph data 351 is constructed from document structure and document paragraph paring data in accordance with methods and systems for constructing a redundancy graph discussed hereinbefore and disclosed in aforementioned U.S. patent application Ser. No. 12/533,901.

Data representing the document redundancy graph for a document set is provided (S601). In the network data processing system 300, redundancy graph data 351 for document set 350 can be provided in storage 308. In this particular embodiment, the search data is one or more keywords relating to particular topics of interest. However, types of search data other than keywords can be utilized such as title, phrase, sentence, or other subject matter.

Figure 7A:
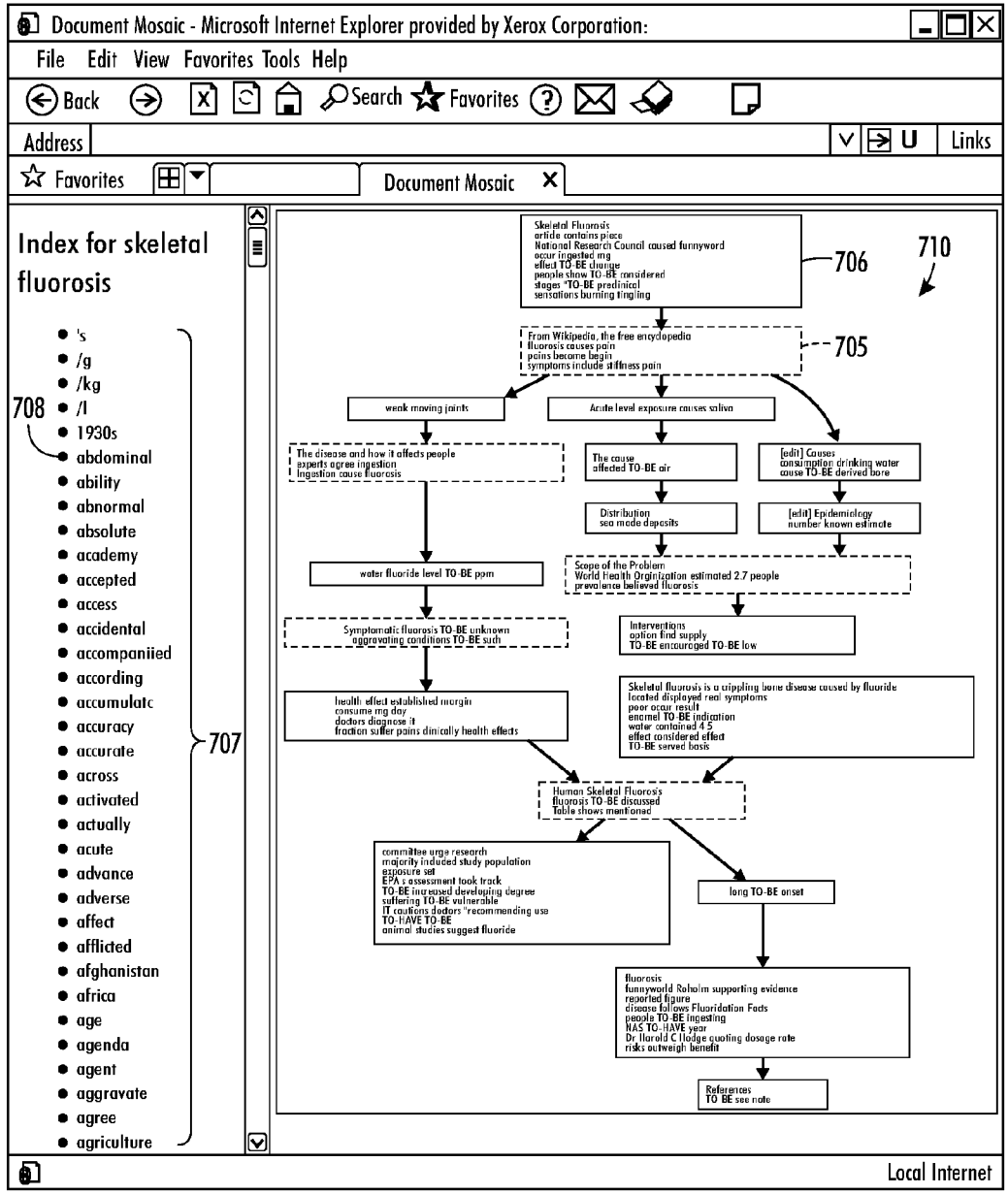
FIG. 7A illustrates a display image of an exemplary redundancy graph and a rendered navigation keyword index according to an embodiment.

Search data can be obtained from a user via the user interface 153 utilizing different methods. In the method of FIG. 6, an index of keywords present in the document set is generated (S602) and then rendered on the user interface (S603). An example of a keyword index for a document set entitled "skeletal fluorosis" is shown in FIG. 7A which illustrates a display image of an exemplary redundancy graph and a rendered navigation keyword index 707 according to an embodiment. In the system of FIGS. 1 to 3, topic visualization module 291 (FIG. 2) can be used to generate the keyword index

707 and rendering device 108 used to render the keyword index on the display device 106 of the user interface 153. This allows a user to view and select searchable keywords 708 via the user interface. An index for a document set can be created by collecting all the words found within the document set and their locations. Alternatively, subsets of the document words can be used, for example, just the nouns, or the nouns and verbs, or words used more than once. Selecting from an index has the advantage of assuring that the chosen word is present in the document set. Alternatively, the keyword(s) can be entered directly into the user interface by the user, for example, by the user typing them into a displayed keyword field. Other methods of specifying one or more keywords other than direct entry and index keyword selection may alternatively be used.

The user interface selection of a keyword from the index is received (S604). In the example of the keyword index of FIG. 7A rendered by the system of FIGS. 1 to 3, the keyword 708 can be selected by the user using the keyboard 104 or pointing device 105 to make a desired keyword selection from the keyword index 707 rendered on the display device 106 of the user interface. This user interface selected keyword is received by the topic visualization module 152.

Document paragraphs are then searched for the user interface specified keyword(s) (S605). In the system of FIGS. 1 to 3, the topic visualization module 291 can perform the search on the redundancy graph data 351 or document set data 350. Document paragraphs containing one or more of the keywords are determined from the search results (S606). Visualization module 291 can scan or search through the redundancy graph data 351 held in the storage 308 to identify which paragraphs contain the one or more keywords 708. Navigation paragraph references containing information relating to the searched one or more keywords can be generated together with identifiers of the corresponding document(s) containing those references based on the paragraphs determined to contain the one or more keywords (S607). In the system of FIGS. 1 to 3, visualization module 291 determines and generates the paragraph references and corresponding document identifiers based on the search results.

Figure 7B:
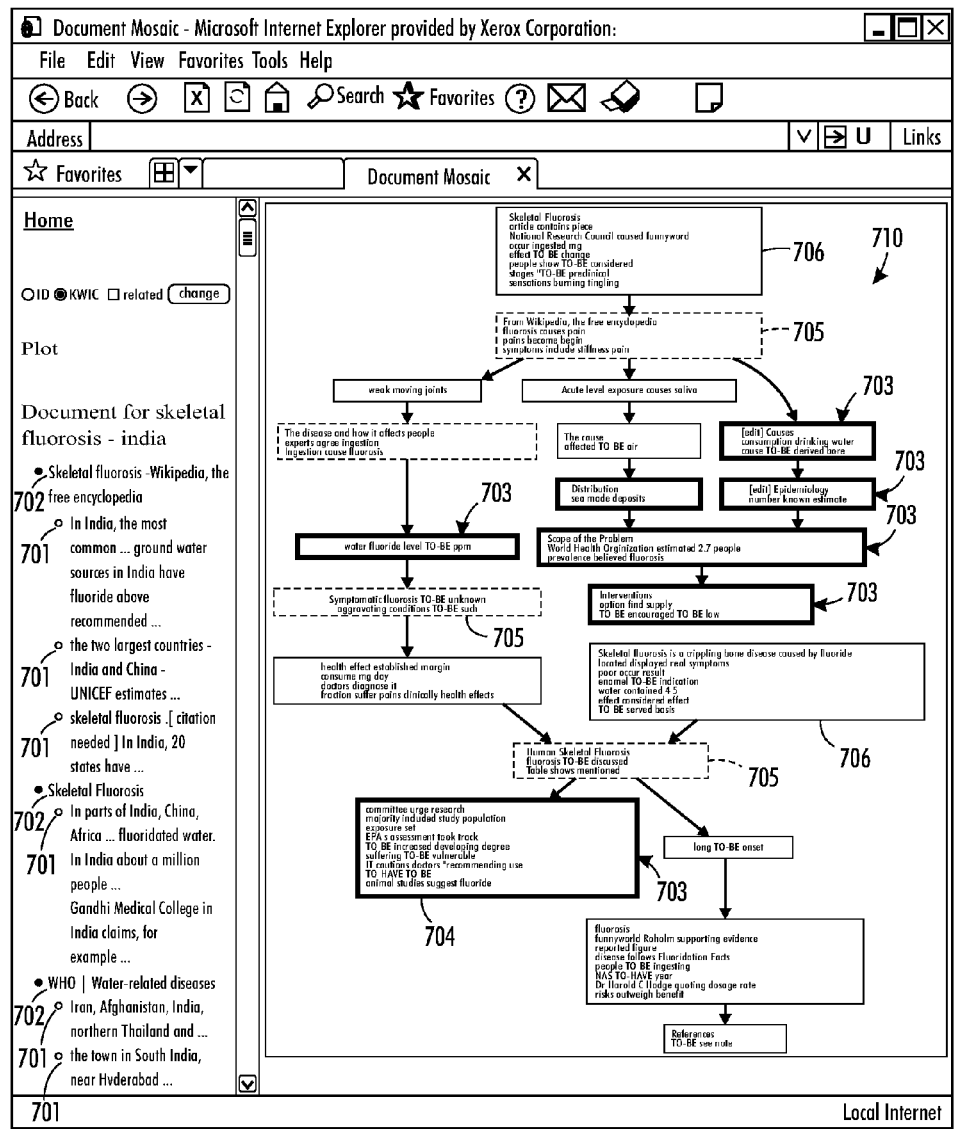
FIG. 7B illustrates a display image of an exemplary redundancy graph showing rendered navigation paragraph references as a result of selecting a keyword from the keyword index shown in FIG. 7A and visually highlighted user selectable nodes containing the paragraph references.

The generated paragraph reference(s) and corresponding document identifier(s) are rendered on the user interface in conjunction with the redundancy graph data (S607). For example, in the system of FIGS. 1 to 3, rendering on display device 106 is performed by rendering device 108 which receives the generated paragraph references for display under instruction from the topic location visualization module 291 and renders the generated paragraph on references on the display device. FIG. 7B illustrates a display image of an exemplary list of generated document identifiers 702 and corresponding navigation paragraph references 701 to the term (India) which the user has selected from keyword index 707. The navigation list of documents and paragraph references can be rendered in conjunction with the redundancy graph. For example, the list of paragraph references can be rendered in a column adjacent the redundancy graph, for example as shown in FIG. 7. Alternatively, the navigation list can be rendered separate from the redundancy graph.

User selectable node(s) containing the determined document paragraphs are identified from the redundancy graph data (S609). Topic visualization module 291 can analyze the redundancy graph data 351 stored in storage 308 to determine which nodes of the graph contain those paragraphs 702. Data for visually highlighting the identified user selectable nodes can then be generated (S610). The visualization module 291 can generate the data for visually highlighting the user selectable nodes 703 containing the document paragraphs 702 containing the one or more keywords 708. The generated data is then rendered on the user interface in conjunction with the redudancy graph such that the identified user selectable nodes are visually highlighted on the redundancy graph (S6011). Rendering on display device 106 is performed by rendering device 108 which receives the generated data for visualizing the identified user selectable nodes 703 under instruction from the topic location visualization module 291. The generated data is rendered on the display device 106 in conjunction with the redundancy graph 701 such that the user selectable nodes 703 are visually highlighted to the user of the user interface (see by way of example FIG. 7B). This provided highlighting of the graph shows the nodes 703 where the term or keyword 708 is found. This tells the user in what portions of the graph those words are used and, thereby, the areas of the graph that are likely to contain the desired topic.

The user selectable nodes can be visually highlighted using different methods. For example, for user selectable nodes represented as boxes containing the identity of the paragraphs which they contain, those particular user selectable nodes containing the search keyword are visually highlighted on the redundancy graph by rendering generated data representing thick border lines of the boxes of the particular user selectable nodes. In the aforementioned example of the display image of FIG. 7B for which the user has selected the keyword (India) 708 and the navigation list of paragraph references 701 to the keyword (India) and associated document identifiers 702 are rendered adjacent the redundancy graph 701, each user selectable node 703 containing the keyword (India) is visually highlighted by a thick box border. For example, as shown in FIG. 7B, the box border lines 704 of user selectable nodes 703 containing the keyword (India) are much thicker than box border lines of the other user selectable nodes 705 and 706 which do not contain the keyword. From this we can see that the visually highlighted nodes 703 in the middle of the graph 701 are most likely to contain a discussion of skeletal fluorosis in India. Alternative methods of visually highlighting the particular user selectable nodes are envisaged. Once a likely portion of the graph has been identified, the user can then click on the individual visually highlighted user selectable nodes of the graph to gather more information or to navigate to the related paragraphs.

Receiving a user interface entered node selection of a visually highlighted user selectable node navigates or links to information relating to the keyword contained in the selected node paragraph(s) and this information is rendered on the user interface (S612). In the system of FIGS. 1 to 3, user selection of the rendered visually highlighted node 703 can be entered into the user interface 153 by the user operating a pointing device, keyboard, touch screen etc. to select the particular visually highlighted node 703 rendered on the display. Thus, a user can navigate to the location of the keyword by selecting one of the visually highlighted nodes on the user interface and navigating to a particular paragraph content containing the keyword and/or by selecting a particular paragraph reference from the navigation list and navigating to the corresponding paragraph containing the keyword.

As already mentioned above, a visually highlighted user selectable node may be either a first type of user selectable node containing redundant information and references to paragraphs in the document set that present a particular fact or topic or a second type of user selectable node which may contain information that is unique to a particular document.

Processes S601 to S612 may be operated in different sequences to the sequence depicted in FIG. 6. For example, S607 & S608 may be performed after S609 to S611. Also, for example, S608 and S611 may be performed together after process S610.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for visualizing topic location in a document redundancy graph, said method comprising:
    constructing a document redundancy graph by representing at least one paragraph associated with a document set as a node among a plurality of nodes, wherein each node among said plurality of nodes represents a unique duster of information, analyzing said plurality of nodes for redundant information by comparing paragraph identifiers for each of said at least one paragraph to obtain a probability value for each pair of paragraphs, and merging certain of said plurality of nodes based on said probability value;
    providing data representing said document redundancy graph for a document or document set;
    determining user interface specified search data;
    searching for said search data in document subcomponents of said document or document set;
    determining at least one of said document subcomponents containing data related to search data;
    determining, from said redundancy graph data, user selectable node(s) containing said determined document subcomponent(s); and
    generating data for identifying said determined user selectable node(s) on a user interface.

2. The method of claim 1, further comprising rendering on a user interface the generated data such that said determined user selectable node(s) are identified.

3. The method of claim 1, wherein generating data for identifying said determined user selectable node(s) on a user interface comprises generating data for visually highlighting said determined user selectable nodes on said user interface.

4. The method of claim 3, further comprising rendering said redundancy graph on said user interface; and
    rendering said generated data on said user interface such that the user selectable nodes of rendered redundancy graph are visually highlighted by displaying thickened border lines around said user selectable nodes.

5. The method of claim 1, further comprising:
    generating an index of keywords present in said document set;
    rendering said keyword index on said user interface; and
    determining user interface specified search data comprises:
    receiving a user interface entered selection of at least one keyword from said keyword index.

6. The method of claim 5, wherein generating data for identifying said determined user selectable node(s) on a user interface comprises:
    generating data for visually highlighting said determined user selectable nodes on said user interface;
    rendering said redundancy graph on said user interface; and
    rendering said generated data on said user interface such that said determined user selectable node(s) of said rendered redundancy graph are visually highlighted.

7. The method of claim 6, further comprising:
    generating, based on said at least one determined document subcomponent, at least one navigation document subcomponent reference to information relating to selected keyword(s); and
    rendering said generated at least one navigation document subcomponent reference on said user interface.

8. The method of claim 6, further comprising, in response to receiving a user interface entered selection of a particular visually highlighted user selectable node, navigating or linking to information contained in said selected visually highlighted node.

9. The method of claim 1, wherein said document subcomponents comprise document paragraphs.

10. A system for visualizing a topic location in a document redundancy graph, said system comprising:
    a processor;
    a data bus coupled to said processor; and
    a computer-usable medium embodying computer code, said computer-usable medium being coupled to said data bus, said computer program code comprising instructions executable by said processor and configured to:
    construct a document redundancy graph by representing at least one paragraph associated with a document set as a node among a plurality of nodes, wherein each node among said plurality of nodes represents a unique duster of information, analyzing said plurality of nodes for redundant information by comparing paragraph identifiers for each of said at least one paragraph to obtain a probability value for each pair of paragraphs, and merging certain of said plurality of nodes based on said probability value;
    provide data representing a document redundancy graph for a document or document set;
    determine a user interface specified search data;
    search for said search data in document subcomponents of said document or document set;
    determine at least one of said document subcomponents containing data related to search data;
    determine, from said redundancy graph, data user selectable node(s) containing said determined document subcomponent(s); and
    generate data for identifying said determined user selectable node(s) on a user interface.

11. The system of claim 10, wherein said computer program code further comprises instructions executable by said processor and configured to:
    generate data for visual highlighting said determined user selectable nodes on said user interface;
    render said redundancy graph on said user interface; and
    render said generated data on said user interface such that the user selectable nodes of said rendered redundancy graph are visually highlighted.

12. The system of claim 11, wherein said computer program code further comprises instruction executable by said processor and configured to:
    determine a keyword from said specified search data; and
    use said keyword to generate said data for identifying said determined user selectable node(s) on a user interface.

13. The system of claim 12, wherein said computer program code further comprises instructions executable by said processor and configured to:
    generate an index of keywords present in said document set;
    render said keyword index on said user interface; and determine a user interface entered selection of at least one keyword from said keyword index, wherein said user interface specified search data comprises said selected keyword(s).

14. The system of claim 12, wherein said computer program code further comprises instructions executable by said processor and configured to:
    search for said selected keyword(s) in document subcomponent(s) of said document or document set;
    determine at least one document subcomponent containing said selected keyword(s);
    generate based on said at least one determined document subcomponent at least one document subcomponent reference to information relating to selected keyword(s); and
    render said generated at least one document subcomponent reference on said user interface.

15. The system of claim 12, wherein said computer program code further comprises instructions executable by said processor and configured to:
    in response to receiving a user interface entered selection of a particular visually highlighted user selectable node, navigating or linking to information contained in said selected visually highlighted node.

16. A computer program product comprising: a non-transitory computer-usable data carrier storing instructions that, when executed by a computer, cause the computer to perform a method for visualizing topic location on a redundancy graph, the method comprising:
    constructing a document redundancy graph by representing at least one paragraph associated with a document set as a node among a plurality of nodes, wherein each node among said plurality of nodes represents a unique cluster of information, analyzing said plurality of nodes for redundant information by comparing paragraph identifiers for each of said at least one paragraph to obtain a probability value for each pair of paragraphs, and merging certain of said plurality of nodes based on said probability value;
    providing data representing a document redundancy graph for a document or document set;
    determining user interface specified search data;
    searching for said search data in document subcomponents of said document or document set;
    determining at least one of said document subcomponents containing data related to search data;
    determining, from said redundancy graph, data user selectable node(s) containing said determined document subcomponent(s); and
    generating data for identifying said determined user selectable node(s) on a user interface.

17. The computer program product of claim 16, wherein generating data for identifying said determined user selectable node(s) on a user interface comprises generating data for visually highlighting said determined user selectable nodes on said user interface, wherein the method further comprises:
    rendering said redundancy graph on said user interface; and
    rendering said generated data on said user interface such that the user selectable nodes of rendered redundancy graph are visually highlighted.

18. The computer program product of claim 16, the method comprising determining a keyword from said specified search data; and
    using said keyword to generate said data for identifying said determined user selectable node(s) on a user interface.

19. The computer program product of claim 17, wherein the method further comprises:
    generating an index of keywords present in said document set;
    rendering said keyword index on said user interface; and
    wherein receiving a user interface specified search data comprises:
    receiving a user interface entered selection of at least one keyword from said keyword index.

20. The computer program product of claim 17, the method further comprising:
    generating based on said at least one determined document subcomponent at least one navigation document subcomponent reference to information relating to selected keyword(s);
    rendering said generated at least one navigation document subcomponent reference on said user interface; and
    in response to receiving a user interface entered selection of a particular visually highlighted user selectable node navigating or linking to information contained in said selected visually highlighted node.

* * * * *